(12) United States Patent
Youngblood, Jr.

(10) Patent No.: US 12,209,380 B2
(45) Date of Patent: Jan. 28, 2025

(54) HEAP LEACH LINER

(71) Applicant: Solmax International Inc., Varennes (CA)

(72) Inventor: Jimmy Gordon Youngblood, Jr., Kingwood, TX (US)

(73) Assignee: Solmax International Inc. (CA)

(*) Notice: Subject to any disclaimer, the term of this patent is extended or adjusted under 35 U.S.C. 154(b) by 232 days.

(21) Appl. No.: 17/965,186

(22) Filed: Oct. 13, 2022

(65) Prior Publication Data

US 2024/0125080 A1  Apr. 18, 2024

(51) Int. Cl.
*E02D 31/00* (2006.01)
*C04B 14/10* (2006.01)
*C04B 24/38* (2006.01)
*C04B 111/00* (2006.01)
*C04B 111/23* (2006.01)

(52) U.S. Cl.
CPC .......... *E02D 31/004* (2013.01); *C04B 14/104* (2013.01); *C04B 24/383* (2013.01); *C04B 2111/00775* (2013.01); *C04B 2111/23* (2013.01)

(58) Field of Classification Search
CPC ............ E02D 31/004; E02D 2300/004; E02D 2300/0042; E02D 2300/0043
USPC ............................ 405/129.55, 267, 268, 270
See application file for complete search history.

(56) References Cited

U.S. PATENT DOCUMENTS

| | | | | |
|---|---|---|---|---|
| 4,624,982 A * | 11/1986 | Alexander | .......... | C04B 40/0039 524/557 |
| 5,114,275 A * | 5/1992 | West | ....... | E02D 31/00 106/900 |
| 5,860,772 A * | 1/1999 | Starita | .......... | E02D 31/004 405/38 |
| 9,328,216 B2 * | 5/2016 | Di Emidio | ............ | C04B 28/001 |
| 9,758,432 B2 | 9/2017 | Landis et al. | | |
| 2012/0216707 A1 | 8/2012 | Youngblood et al. | | |
| 2012/0219366 A1 | 8/2012 | Landis et al. | | |
| 2012/0219367 A1 * | 8/2012 | Landis | ................. | E02D 31/004 405/268 |

FOREIGN PATENT DOCUMENTS

| | | | |
|---|---|---|---|
| CN | 114149203 A | * | 3/2022 |
| CN | 114149203 B | | 9/2022 |
| KR | 100240802 B1 | * | 1/2000 |
| KR | 20190102004 A | * | 9/2019 |
| WO | WO 2012/101410 A1 | | 8/2012 |

OTHER PUBLICATIONS

Benson, Craig H., et al., "Bentonite-Polymer Composite Geosynthetic Clay Liners for Heap Leach Liners," Proceedings of Heap Leach Solutions 2022, Oct. 2022, pp. 13-25, Sparks, USA.
European Search Report, Application No. 232031252, Feb. 9, 2024, 7 pages, Eurogean Patent Office, Munich, Germany.

* cited by examiner

*Primary Examiner* — Frederick L Lagman
(74) *Attorney, Agent, or Firm* — Barnes & Thomburg LLP; Tina M. Dorr

(57) ABSTRACT

A geosynthetic clay liner for containing low pH, acidic fluids including a dry blended mix 90%-99% by weight bentonite and 1%-10% by weight high molecular weight cellulose ether polymer, and a method and containment including the liner to protect an environment around a site having low pH, acidic fluids.

17 Claims, 1 Drawing Sheet

HEAP LEACH LINER

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to the use of geosynthetic clay liners, and more particularly to bentonite barrier compositions for use in acidic/low pH environments.

BACKGROUND OF THE INVENTION

Various materials and procedures have been developed and utilized to form low permeability barriers in containment applications. For example, low permeability barriers are needed to separate waste fluids from contaminating the surrounding environment in industrial mineral and metal mining sites, and landfill sites. These barriers are also useful for aqueous containment applications such as leachate ponds, retention ponds, and water storage reservoirs. The term "containment" when used herein refers to both aqueous containments (e.g., ponds) as well as other containments that have components that are better separated from the surrounding environment. For example, "containment" may refer to the separation of ponds of liquid waste streams from industrial processes or leachates produced from these or other industrial processes from the surrounding environments.

For example, a copper mining site 10 is illustrated in FIG. 1 and includes crushed ore is piled in a heap 12 on top of a liner or layer 14, and a percolating chemical solution (typically dilute sulfuric acid) 16 is percolated through sprinklers 20 onto the heap 12, thereby leaching metals 24 down through the heap 12.

The liner 14 at the bottom of the heap 12 is sloped so that the leaching metals flow to a collection pool 28 which collects pregnant leach solution 32. The pregnant leach solution 32 is typically 60% to 70% pure copper in solution, which is taken from the collection pool 28 to a solvent extraction site 36 (where the sulfuric acid is separated and then recycled back to the sprinklers 20 and then onto the heap 12).

Of course, regulations (e.g., local, international, state and federal standards) require that materials in the mining process do not contaminate the surrounding environment. It is thus crucial that the barriers, such as the liner 14 and the collection pool 28, have low permeability to block contaminants from escaping to the surrounding environment, particularly in application with highly acidic (low pH) materials such as sulfuric acid.

Barrier geomembranes such as geosynthetic clay liners (GCLs) have often been used in geotechnical sites for a variety of reasons, including to block contaminants from escaping to the environment around the site. See, for example, U.S. Pat. No. 9,758,432 and U.S. Publication Nos. 2012/0216707 and 2012/0219366 regarding high pH environments. Further, geosynthetic clay liners (GCL) comprised of sodium (Na) bentonite have been used in many applications, including lining systems to collect leach solution from heap leaching of copper ore. However, the high concentration and low pH of the solutions in such systems can suppress swelling of such GCLs, resulting in high hydraulic conductivity through the barrier. As a result, maintaining the necessary barrier low permeability in low pH, high acidic applications has been difficult over time, particularly given the aggressiveness of the leachate in those applications.

SUMMARY OF THE INVENTION

In one aspect of the disclosure, a geosynthetic clay liner for containing low pH, acidic fluids such as leachate is provided, including a dry blended mix of bentonite and a high molecular weight cellulose ether polymer, wherein the mix is 1%-10% by weight of the polymer and 90%-99% by weight bentonite.

In one form of this aspect of the disclosure, the geosynthetic clay liner is adhered to a geotextile. In an alternate form, the geosynthetic clay liner is between two geotextiles wherein the geotextiles are connected together on opposite sides of the clay liner by needle punching.

In another form of this aspect of the disclosure, the polymer and the bentonite have a maximum particle size of 16 mesh. In a further form, when mixed the polymer has a maximum particle size of 200 mesh.

In another aspect of the disclosure, a method of protecting an environment around a site having low pH, acidic fluids is provided, including (a) providing a geosynthetic clay liner by mixing a bentonite barrier composition consisting of a dry mix of 90%-99% by weight bentonite particles and 1%-10% by weight high molecular weight cellulose ether particles, and (b) lining a containment with the geosynthetic clay liner, wherein the geosynthetic clay liner provides separation between low pH acidic fluids in the containment and a surrounding environment, wherein when hydrated the high molecular weight cellulose ether particles form a gel that clogs open pores between the hydrated bentonite particles, resulting in narrow and tortuous flow paths around the bentonite particles.

In one form of this aspect of the disclosure, at least some of the fluids have a pH which is no more than about 2.

In another form of this aspect of the disclosure, the polymer and the bentonite have a maximum particle size of 16 mesh. In a further form, when mixed the polymer has a maximum particle size of 200 mesh.

In still another form of this aspect of the disclosure, the fluid is leachate from copper extracted from ore at the site.

In yet another aspect of the disclosure, a containment for low pH, acidic fluids is provided, including a geosynthetic clay liner consisting of a bentonite barrier composition consisting of a dry mix of 90%-99% by weight bentonite particles and 1%-10% by weight polymer particles of high molecular weight cellulose ether. A containment area for the fluids is lined with the geosynthetic clay liner so that the geosynthetic clay liner provides a barrier between the containment area and a surrounding environment. When hydrated the high molecular weight cellulose ether particles form a gel that clogs open pores in the hydrated bentonite, resulting in narrow and tortuous flow paths around the bentonite particles.

In one form of this aspect of the disclosure, the liner is adapted to result in the narrow and tortuous flow paths with fluids having a pH which is about 2 and lower.

In another form of this aspect of the disclosure, the liner is adapted to contain leachate from extraction of copper from copper ore.

In still another form of this aspect of the disclosure, the geosynthetic clay liner is adhered to a geotextile. In an alternate form, the geosynthetic clay liner is between two geotextiles wherein the geotextiles are connected together on opposite sides of the clay liner by needle punching.

In yet another form of this aspect of the disclosure, the polymer and the bentonite have a maximum particle size of 16 mesh. In a further form, when mixed the polymer has a maximum particle size of 200 mesh.

Other objects, features, and advantages of the invention will become apparent from a review of the entire specification, including the appended claims and drawings.

DETAILED DESCRIPTION OF THE DISCLOSURE

A geosynthetic clay liner 100 is disclosed herein having low permeability in applications encountering low pH, acidic (i.e., pH less than 7) fluids such as leachate from a low pH, acidic copper heap. The liner consists of a dry blended mix of 90%-99% by weight bentonite and 1%-10% by weight polymer, with the polymer being high molecular weight cellulose ether. The bentonite and polymer are particles when dry mixed to form the liner, and have a maximum particle size of about 16 mesh. Advantageously, the polymer particles may have a maximum particle size less than the bentonite maximum particle size. That is, the polymer maximum sizes may be about 200 mesh so that polymer particles will fit into spaces between the bentonite particles.

In low pH, high acidic environments such as extraction sites with copper heap leaching of low grade ore, water is tied up in chemical reactions and thus not as readily available to result in swelling of bentonite particles necessary for the barrier liner permeability to be low enough to prevent leak of materials through the barrier and into the surrounding environment.

Bentonite+high molecular weight cellulose ether polymer liners as disclosed herein are less chemically sensitive, whereby the polymer releases water which allows the bentonite of the liner to swell so as to close spaces between bentonite particles. As a result of such swelling, the liner 100 will have narrow and tortuous flow paths between the bentonite particles, and therefore low permeability through the liner.

Figure 2:
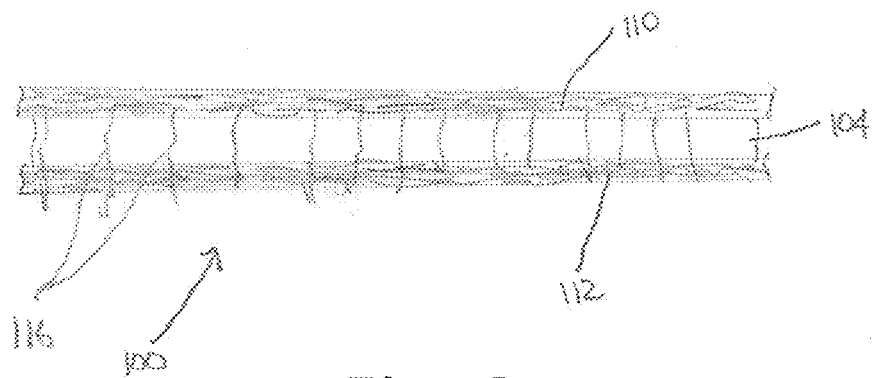
FIG. 2 illustrates a geosynthetic clay liner as disclosed herein for use in low pH, high acidic environments such as copper heap leaching.

It should be appreciated that the polymer-bentonite mixture 104 as disclosed herein may for convenience of handling and installing be adhered to a geotextile or, as illustrated in FIG. 2, may be a layer between two geotextiles 110, 112 wherein the geotextiles 110, 112 are connected together on opposite sides of the clay liner by needle punching.

Figure 1:
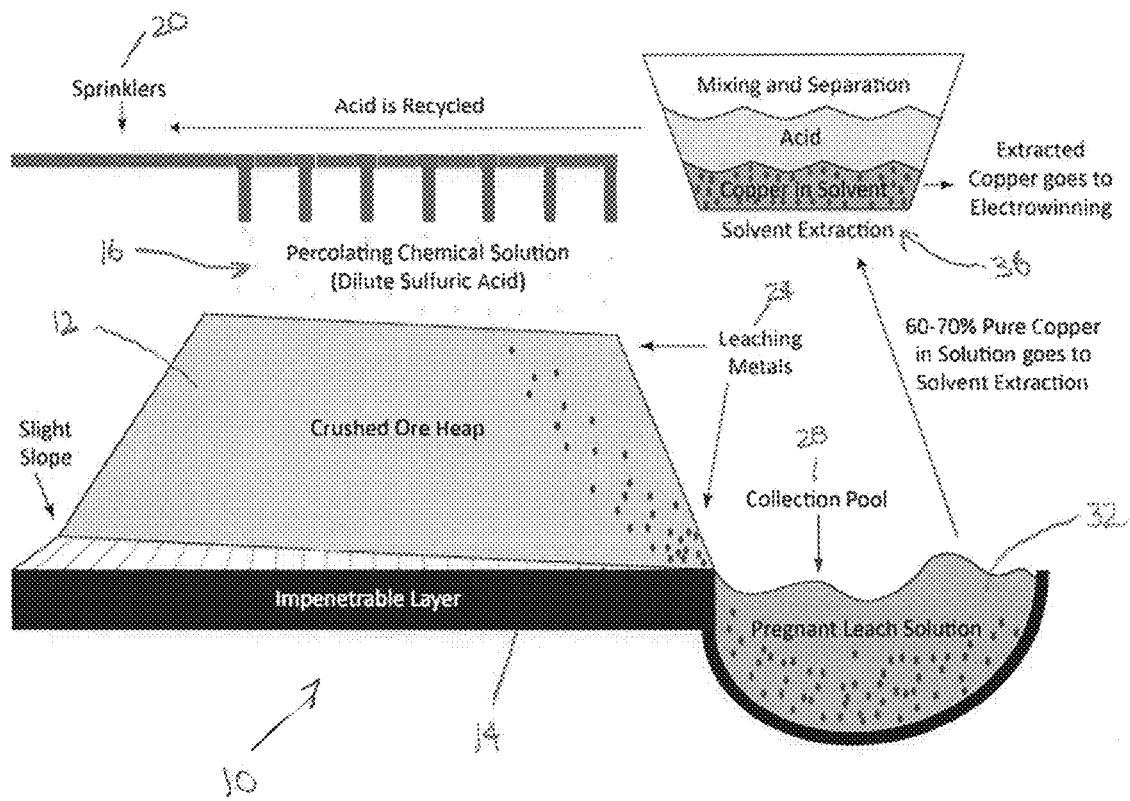
FIG. 1 illustrates a site for extracting copper from a crushed ore heap.

It should then also be appreciated that the liner 100 can be used to form a containment area for low pH, acidic leachate, such as the collection pool 28 and/or liner/layer 14 of copper mining sites 10 such as shown in FIG. 1. That is, containment areas for such leachate may advantageously be lined with the polymer-bentonite geosynthetic clay liner 100 described herein so that the geosynthetic clay liner provides a barrier between leachate in the containment area and a surrounding environment. Moreover, when hydrated, the high molecular weight cellulose ether particles may also form a gel that clogs open pores within the hydrated bentonite, further narrowing the flow paths around the bentonite particles and resulting in low hydraulic conductivity through the liner 100.

It should be still further recognized that a liner 100 with the polymer-bentonite mixture 104 as described herein (with or without geotextiles) may advantageously be used in a method of protecting an environment surrounding a site having low pH, acidic fluids, including but not limited to leachate. That is, a geosynthetic clay liner 100 consisting of a mixture of bentonite and a high molecular weight cellulose ether (in the described 1%-10%/90%-99% by weight proportions) may be used to line a containment for the low pH, acidic fluid so that the geosynthetic clay liner provides a barrier between leachate in the containment and a surrounding environment. When hydrated, the high molecular weight cellulose ether not only releases water which allows the bentonite of the liner to swell but it also forms a gel that still further clogs open pores between the hydrated bentonite particles, resulting in narrow and tortuous flow paths around the bentonite granules and low hydraulic conductivity.

It should be appreciated that liners as disclosed herein may be used advantageously not only in copper mining but also in a variety of applications and environments requiring containment of acidic fluids (i.e., with a pH less than 7), particularly those with a pH of about 2 or less.

Still other aspects, uses, objects and advantages of the geosynthetic clay liners disclosed herein will be recognizable by a full review of the specification and drawings herein.

The invention claimed is:

1. A geosynthetic clay liner for containing low pH, acidic fluids, comprising a dry blended mix of bentonite and a high molecular weight cellulose ether polymer, wherein said mix is 1%-10% by weight of said polymer and 90%-99% by weight bentonite, wherein when hydrated the high molecular weight cellulose ether particles form a gel that clogs open pores between the hydrated bentonite particles, resulting in narrow and tortuous flow paths around said bentonite particles.

2. The clay liner of claim 1, wherein said geosynthetic clay liner is adhered to a geotextile.

3. The clay liner of claim 1, wherein said geosynthetic clay liner comprises a layer between two geotextiles wherein said geotextiles are connected together on opposite sides of said clay liner by needle punching.

4. The clay liner of claim 1, wherein when mixed said polymer and said bentonite have a maximum particle size of 16 mesh.

5. The clay liner of claim 4, wherein when mixed said polymer has a maximum particle size of 200 mesh.

6. A method of protecting an environment around a site having low pH, acidic fluids, comprising:
   providing a geosynthetic clay liner by mixing a bentonite barrier composition consisting of a dry mix of
      90%-99% by weight bentonite particles, and
      1%-10% by weight high molecular weight cellulose ether polymer particles; and lining a containment with the geosynthetic clay liner, wherein the geosynthetic clay liner provides separation between low pH, acidic fluids in the containment and a surrounding environment, wherein when hydrated the high molecular weight cellulose ether particles form a gel that clogs open pores between the hydrated bentonite particles, resulting in narrow and tortuous flow paths around said bentonite particles.

7. The method of claim 6, wherein at least some of said fluids have a pH which is no more than about 2.

8. The method of claim 6, wherein when mixed said polymer and said bentonite have a maximum particle size of 16 mesh.

9. The method of claim 8, wherein when mixed said polymer has a maximum particle size of 200 mesh.

10. The method of claim 6, wherein copper is extracted from ore at said site and said fluid is leachate.

11. A containment for low pH, acidic fluids, comprising:
a geosynthetic clay liner consisting of a bentonite barrier composition consisting of a dry mix of
   90%-99% by weight bentonite particles; and
   1%-10% by weight high molecular weight cellulose ether polymer particles; and
a containment area for the fluids, said area being lined with the geosynthetic clay liner, wherein the geosynthetic clay liner provides a barrier between the containment area and a surrounding environment, wherein when hydrated the high molecular weight cellulose ether particles form a gel that clogs open pores in the hydrated bentonite, resulting in narrow and tortuous flow paths around said bentonite particles.

12. The containment of claim 11, wherein said liner is adapted to result in said narrow and tortuous flow paths with fluids having a pH which is about 2 and lower.

13. The containment of claim 11, wherein said liner is adapted to contain leachate from extraction of copper from copper ore.

14. The containment of claim 11, wherein said geosynthetic clay liner is adhered to a geotextile.

15. The containment of claim 11, wherein said geosynthetic clay liner comprises a layer between two geotextiles wherein said geotextiles are connected together on opposite sides of said clay liner by needle punching.

16. The containment of claim 11, wherein when mixed said polymer and said bentonite have a maximum particle size of 16 mesh.

17. The containment of claim 16, wherein when mixed said polymer has a maximum particle size of 200 mesh.

* * * * *